May 2, 1961 N. A. VOGEL ET AL 2,982,381
POSITIONING DEVICE
Filed Dec. 11, 1958
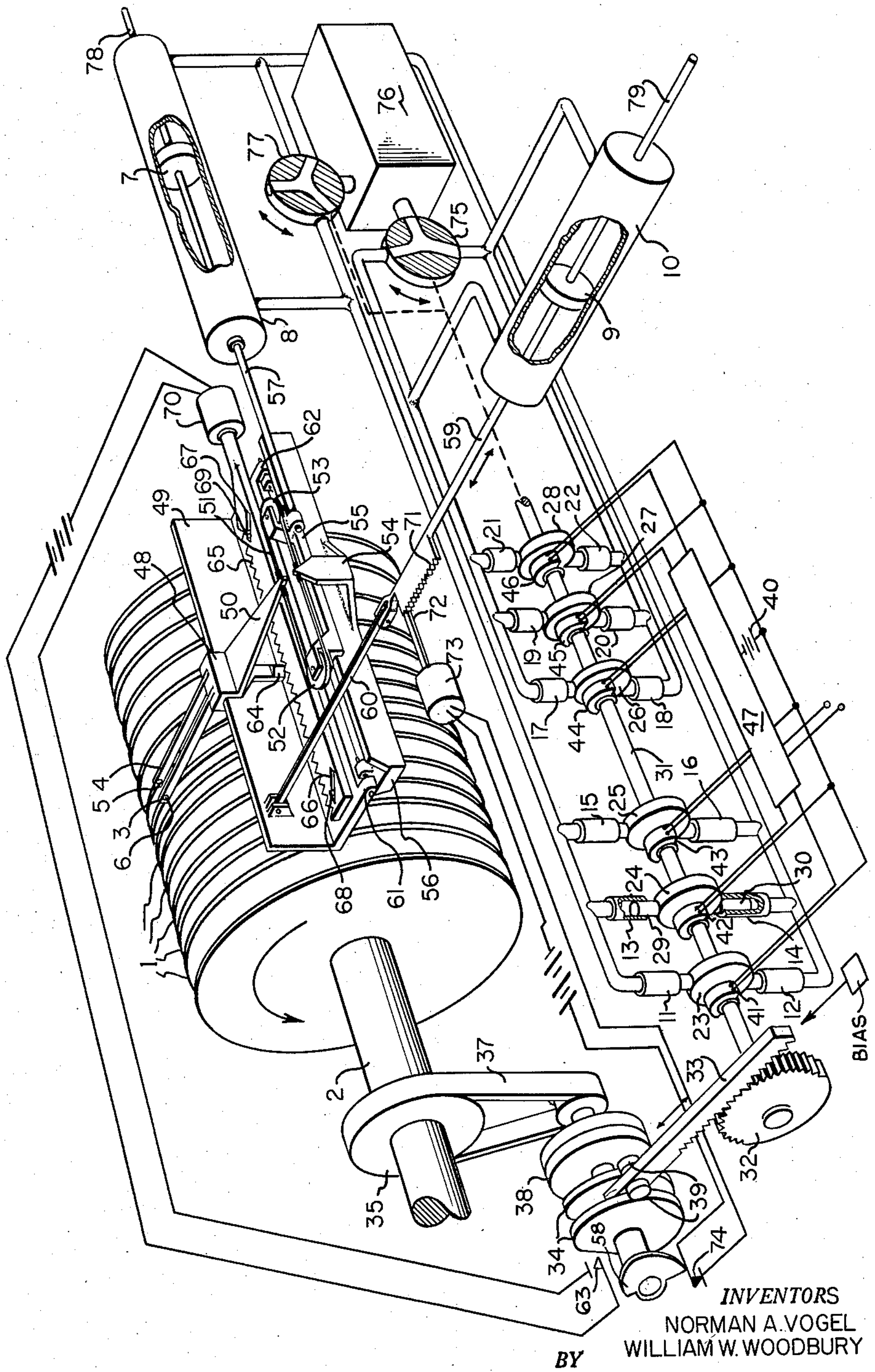
INVENTORS
NORMAN A. VOGEL
WILLIAM W. WOODBURY
BY
Edward A. Robinson
ATTORNEY United States Patent Office 2,982,381
Patented May 2, 1961

2,982,381

POSITIONING DEVICE

Norman A. Vogel, Sunnyvale, and William W. Woodbury, Palo Alto, Calif., assignors to International Business Machines Corporation, New York, N.Y., a corporation of New York Filed Dec. 11, 1958, Ser. No. 779,582
13 Claims. (Cl. 192—.098)

This invention relates to hydraulic positioning devices, and more particularly to such arrangements useful for moving an access arm carrying a transducer or the like to a desired address position in a data storage file of a computer or data processing machine.

Heretofore, data has been recorded on and reproduced from a magnetic surface by a transducer positioned to magnetically coact with a small incremental or "bit" area of the surface and operable to trace a "track" of magnetic "bits" of information as the surface moves past the transducer. Large data storage units may employ a series of rotatable discs, and one or more transducers supported by an access arm which may move to a selected disc and thence move across the disc to position the transducer upon a selected track of a selected disc for recording or reproducing data. The selective positioning of the transducer along a first axis to select a disc, and then along a second axis to select a track of that disc must be in response to input address signals or information.

It is an object of this invention to provide an improved positioning device and more particularly it is an object to provide such a device for moving an access arm or the like to a selected position in a data storage device.

A further object of this invention is to provide an improved access mechanism including a transducer which is caused to move hydraulically to a selected position along a first axis and then is caused to move to a further selected position along another axis.

Another object of this invention is to provide an improved hydraulic-mechanical arrangement for supporting access arms with transducers thereon adjacent to an array of rotating discs such that the access arm may move to a selected position along an axis longitudinal of the array of selecting a particular rotating disc therein, and thence may pivot inwardly such that the transducer moves to a selected track upon the selected disc.

Briefly stated, according to a preferred embodiment of this invention, a hydraulic positioning device includes a slave cylinder having a movable piston and a plurality of actuation cylinders arranged in pairs with one cylinder of each pair hydraulically connected to one end of the slave cylinder and the other cylinder of each pair hydraulically connected to the other end of the slave cylinder. During each positioning operation, a mechanical drive means displaces the pistons in selected pairs of actuation cylinders such that hydraulic fluid is forced into one end of the slave cylinder and extracted from the other end, thereby moving the piston. Movement of the access arm along two different axes is accomplished by two such slave cylinders each having a group of actuation or drive cylinders hydraulically associated therewith. The access arm may thereby be moved by one piston to a desired disc and then be pivoted by a second piston to a desired track on that disc.

Other objects of the invention will be pointed out in the following description and claims and illustrated in the accompanying drawing which discloses, by way of example, the principle of the invention and the best mode which has been contemplated of applying that principle.

The single figure of the drawing illustrates in perspective a rotating disc type memory device including access arms positionable by a mechanical-hydraulic apparatus in accordance with this invention.

The memory device illustrated includes a plurality of discs 1 mounted on and continuously rotated by a shaft 2. A pair of parallel extending access arms 3 and 4 each carry a transducer 5 and 6 respectively and each transducer may magnetically coact with corresponding surfaces of the disc 1 for recording data thereon and/or reproducing previously recorded data therefrom. The dual access arms 3 and 4 may be positioned longitudinally of the storage device so as to straddle a particular disc 1 with one arm on each side thereof. The access arms 3 and 4 may then be pivoted inwardly carrying the transducers 5 and 6 to selected concentric tracks on opposite sides of the selected disc 1. By this positioning arrangement and by electrical selection of the transducer 5 or the transducer 6, any track on either side of any disc may be selected for recording or reproducing data.

The positioning of the access arms 3 and 4 along a first or longitudinal axis is accomplished by a mechanical coupling to a piston 7 movable within a cylinder 8. The pivotal movement of the access arms 3 and 4 is accomplished by mechanically coupling to another piston 9 within a second cylinder 10. The piston 7 moves in response to selective displacement of hydraulic fluid in actuation cylinders 11 through 16. These cylinders are arranged in pairs such that a first cylinder of each pair 11, 13 and 15 is hydraulically connected to a first end of the slave cylinder 8 while the second cylinder of each pair 12, 14 and 16 is hydraulically connected to the other end of the slave cylinder 8. Similarly, the slave cylinder 10 is hydraulically connected at one end to actuation cylinders 17, 19 and 21 and at the other end to actuation cylinders 18, 20 and 22 which are paired respectively with the cylinders 17, 19 and 21. A plurality of cams 23 through 28 are positioned respectively between each pair of actuation cylinders and when rotated, will cause opposite or complementary displacement of fluid within each pair of actuation cylinders. The drawing illustrates one pair of cylinders 13 and 14 cut away showing pistons 29 and 30 slidable therein and bearing against the surface of the cam 24.

The cams 23 through 28 constitute a portion of a selective drive means for mechanically operating all of the pistons in cylinders 11 through 22 and for selectively displacing fluid within the actuation cylinders. Each of the cams 23 through 28 is loosely mounted upon a shaft 31 which oscillates continuously through 180°. The shaft 31 may be driven by a sector gear 32 fixed thereto and engaged by a rack 33. The rack 33 is continuously oscillated by a cam or pair of cams 34 which is rotated from the main drive shaft 2 by a mechanical linkage including a pair of pulleys 35 and 36 with a belt 37 trained therearound and further including a single revolution clutch 38. The drawing shows the rack 33 having cam rollers 39 which may be biased against the surface of the cams 34 by any suitable means such as a spring.

A cycle of operation for selectively positioning the access arms 3 and 4 would be commenced by the single revolution clutch 38 which engages and causes one revolution of the cams 34 resulting in one complete oscillation of the rack 33 and shaft 31. Associated with each cam 23 through 28 is a magnetic clutch 41 through 46 which may be electrically energized by a battery 40, or a similar source of potential, through an address register 47 to lock the associated cam to the shaft 31. During a positioning operation, the shaft 31 rotates in one direction and those cams 23 through 25 which have been selected by the address register are seized by the magnetic clutches 41, 42 and 43 will rotate from a first dwell position to a second dwell position to displace fluid in selected pairs of cylinders 11 through 16. Thus, if the piston 29 within the cylinder 13 moves upwardly the fluid displaced thereby must move into the left end (as shown in the drawing)

of the slave cylinder 8 while an equal amount of fluid may be displaced into the cylinder 14 from the right hand of the slave cylinder 8. If the pair of cylinders 13 and 14 was the only pair selected, the piston 7 with the cylinder 8, will move incrementally to the right by an amount determined by the volume of fluid displaced in the cylinders 13 and 14. During reverse rotation of shaft 31, the cams 26—28 which have been selected by the address register are seized by magnetic clutches 41—46 and rotated from a first dwell position to a second dwell position. Fluid is thus displaced from selected pairs of cylinders 17—22 to opposite ends of cylinder 10 to move piston 9 a desired amount.

If we define positive displacement of fluid such that an actuation cylinder injects fluid into a slave cylinder, and negative displacement such that fluid is extracted from the slave cylinder, then we may conclude that the piston of the slave cylinder will be moved in accordance with the algebraic sum of all of the displacements of those cylinders hydraulically connected to one end of the slave cylinder. Since the selective drive means or cams are arranged to displace the actuation cylinders of a single pair in an opposite or complementary sense, the fluid injected into one end of a slave cylinder is always equal to the fluid extracted from the other end thereof.

The actuation cylinders 11 through 16 may be "binary coded" such that the displacement of a first pair of cylinders, for example, cylinders 11 and 12, may be considered as a unit displacement whereupon the displacement of the second pair of cylinders 13 and 14 may be two units or twice that of the first pair; and the displacement of the third pair of cylinders 15 and 16 will be four units or twice that of the second pair. Further cylinders may be added having displacements of 8 units, 16 units, 32 units, etc. Since the movement and positioning of the slave piston corresponds to the algebraic sum of the displacements of each set of actuation cylinders, it follows that the slave piston may be selectively moved to any of eight positions if three pairs of binary coded actuation cylinders are associated therewith. With each additional pair of actuation cylinders, the positioning capacity of this apparatus is doubled, and therefore, with four pairs of actuation cylinders, sixteen selective positions are possible, with five pairs, thirty-two positions are possible, etc. Similarly, the actuation cylinder pairs 17—18, 19—20, and 21—22 may be binary coded to permit additional increments of displacement of the piston 9 and additional possible positions of the access arms 3 and 4.

The slave cylinder 8 is connected to move the access arms 3 and 4 longitudinally by a mechanical linkage which includes a supporting carriage or shoe 48 slidably mounted on a rail 49 and carrying the access arms 3 and 4. The carriage 48 includes an outwardly extending bracket 50 attached to a braided steel drive cable 51. The cable 51 is trained about a pair of pulleys 52 and 53 and forms a closed loop having one span attached to the movable bracket 50 while the other span is attached to a fixed bracket 54. The pulleys 52 and 53 are mounted on a slidable carriage 55 movable along a rail 56. The carriage 55 may be directly connected to a piston rod 57 extending through the slave cylinder 8 and having the piston 7 mounted thereon. The carriage 55 with the pulleys 52 and 53 thereon constitute a displacement doubler because any incremental movement of the piston 7 will be directly transferred to the carriage 55 causing the pulleys 52 and 53 to move and because one span of the drive cable 51 is attached to a fixed bracket 54, the other span must move and carry the movable bracket 50 therewith a distance which is doluble that increment of movement of the drive piston 7 and piston rod 57.

Movement of the second piston 9 is mechanically coupled to pivot the access arms 3 and 4 and thereby accomplish a positioning along a second axis. The mechanical linkage for accomplishing this movement or positioning comprises a piston rod 59 attached to and movable with the piston 9, a link 60 pivotally connected at each end between the piston rod 59 and the normally upright rail 49. The rail structure 49 is hinged at 61 and 62 such that it may pivot about an axis which coincides with the inner span of the cable 51 which is attached to the movable bracket 50. Thus, as the piston 9 and piston rod 59 move axially, the link 60 transmits this movement to pivot the rail 49, and the carriage 48 with the access arms 3 and 4 attached likewise pivot to move the transducers 5 and 6 to an appropriate track of the discs 1. Because the pivotal axis 61—62 is aligned with the span of the braided cable 51, the bracket 50 will merely twist the cable slightly without displacing it from its normal span position, and therefore, the cable 51 will not be unduly stressed.

The access arms 3 and 4 must be positioned along two separate axes: longitudinally along the magnetic memory device on the rail 49 and into a track position on a selected disc by pivotal movement of the rail. These two movements may not be accomplished during the same time interval, since during that time when the access arms 3 and 4 are moved longitudinally along the disc array, they must be withdrawn to a zero or home position with respect to the pivotal axis 61—62. This drive arrangement for a movement along two axes, but during separate time intervals, may be accomplished by proper design of the cam 34 and associated mechanisms. A positioning cycle is commenced by engagement of the single revolution clutch 38, whereupon the shaft 31 is rotated with smooth accelerations through 180° in one direction whereupon the shaft will dwell for a moment. Next the shaft is rotated through 180° in the opposite direction and comes to a final dwell in its initial position. The cams 23 through 28 may be simple eccentrics which can be rotated from one extreme to the other extreme in either stroke or half rotation of the shaft 31, the direction of rotation being of no consequence. The magnetic clutches 41, 42 and 43 may be timed by address signals fed into the address register to selectively lock the cams 23, 24 and 25 to the shaft 31 during one stroke or half revolution of the shaft, while the magnetic clutches 44, 45 and 46 may be similarly controlled to selectively engage and lock the cams 26, 27 and 28 for rotation during the other stroke or half revolution of the shaft 31. Thus the pistons 7 and 9 will not move together, but will move in sequence while the cam 34 makes but a single revolution.

In a normal positioning operation, it may be necessary to: first, withdraw the access arms 3 and 4 from a prior position between the discs 1; second, move the access arms along the rail 49 from one disc to another; and finally, insert the access arms to seek the new address position. This three stroke operation may be accomplished in the single revolution provided by the clutch 38, if the cam 34 is designed with an intermediate dwell such that the rack 33 is given two forward strokes and two return strokes. By proper design of the rack 33 and the sector gear 32, each stroke of the rack may rotate the shaft 31 through 180° to provide a completed selective displacement of one group of cylinders 11 through 16 or the other group of cylinders 17 through 22. Since only three strokes are required, the time interval of the fourth stroke may be used for other machine operations such as the recording or reproducing of data on the magnetic track.

During the time when one of the pistons 7 or 9 is moving, it is desirable to lock and hold the other piston. Thus, both pistons have associated detenting means controlled by a cam 58 which may prevent movement thereof. A first detenting means operatively associated with the first slave cylinder 8 and piston 7 therein, includes a detent tooth or pawl 64 fixed to or formed integrally with the carriage 48, and a rack 65 engageable with the detent tooth 64. The rack 65 is mounted on a horizontal part of the rail 49 by means of a pair of diagonal slots 66 and 67 through which extends studs 68 and 69 fixed to the rail structure 49. A solenoid 70 is mcehanically coupled to move the rack 65 forcing it to slide along the slots 66 and 67 causing the rack 65 to engage and hold the detent tooth 64. Solenoid 70 is controlled by a switch 63 which is actuated by cam 58 rotating with cam 34.

The second detenting means associated with the cylinder 10 and piston 9 includes a rack 71 fixed to of formed integral with the piston rod 59 and a detent dog or pawl 72 which may be driven into engagement with the rack 71 by a solenoid 73. Solenoid 73 is controlled by switch 74 which is actuated by cam 58. Thus, the second detenting means 71—72 directly locks the piston rod 59 while the first detenting means 64—65 locks the carriage 48 and thereby indirectly locks the piston rod 57 through the mechanical linkage including the drive cable 51 and the pulleys 52 and 53. Since the detenting means perform the additional function of precisely setting the access arms 3 and 4 in a final position, it is desirable that the detenting means lock a portion of the mechanical linkage most closely associated with the access arms 3 and 4 to eliminate the slight positioning error which may be introduced because of stretching or warping of the cable 51 or other mechanical linkage between the piston rod 57 and the carriage 48 which directly supports the access arms 3 and 4.

As heretofore indicated, one of the solenoids of the two detenting means is de-energized by cam 58 during each stroke of rack 33 to prevent movement of one of the slave pistons 7 or 9 while the other piston is accomplishing its positioning function. In a normal operation for positioning the transducers 5 and 6 upon a particular disc and upon a particular track of that disc, switch 74 is open and detent means 71—72 locks the piston 9 in a home position while switch 63 is closed and the selective displacement of the actuation cylinders 11 through 16 causes the piston 7 to move to a selected position which in turn causes the access arms 3 and 4 to straddle a selected disc 1. During the time when the detent means 71—72 is closed, the piston 9 remains fixed within the slave cylinder 10 and all of the actuation cylinders 17 through 22 associated with the slave cylinder 10 remain unchanged; and, a valve means 75, in response to rotation of shaft 31, opens the hydraulic system associated with the slave cylinder 10 to a fluid reservoir 76 wherein the fluid is maintained at a nominal pressure. During this interval with all of the actuation cylinders 17 through 22 and the slave piston 9 held stationary the hydraulic fluid from the reservoir 76 is permitted to flow into the system thereby replenishing and making up for any leakage of hydraulic fluid either from the system or bypassing the piston 9 within the cylinder 10. The fluid in the hydraulic system associated with the slave cylinder is thus stabilized and held constant in volume regardless of the possibility of slow leakage at various points thereof.

As shown in the drawings, the detent means 71—72 has locked the piston 9 within the slave cylinder 10 while the valve means 75 has opened the hydraulic system of the slave cylinder 10 to the low pressure reservoir 76. At this time, the detent means 64—65 is open such that the piston 7 is free to move within the slave cylinder 8, and a valve means 77 associated therewith is closed in response to rotation of shaft 31 preventing interchange of hydraulic fluid between the two ends of the slave cylinder 8 and the reservoir 76. The apparatus as illustrated in the drawing is being moved longitudinally along the disc array by the positioning means including the slave cylinder 8 while the second positioning means including the slave cylinder 10 is locked stationary and a replenishing valve 75 is restabilizing the volume of oil in that hydraulic system. At a subsequent time, the access arms 3 and 4 will be positioned to straddle a selected disc 1 and then the detenting and valving will be reversed whereupon switch 63 closes and switch 74 opens so the piston 9 will move and cause the access arms to pivot inwardly toward a selected track while the piston 7 will be locked in place. At this time the valve means 75 will change to isolate the two ends of the double acting slave cylinder 10 from each other and from the low pressure reservoir 76, while the valve means 77 will open the two ends of the slave cylinder 8 to each other and to the reservoir 76.

For ease of description and understanding, the valve means 75 and 77 have been shown schematically as rotatable cores having passages therein which may be moved into alignment with exterior ports to permit fluid passage, or may be moved into misalignment to illustrate a closed position. In actual practice, it has been found satisfactory to use the well known spool type valve to connect each end of each of the slave cylinders 8 and 10 individually to the reservoir 76. In the interest of further simplicity and ease of understanding, the reservoir is shown as a simple rectangular block. In actual practice, a tank and pump for maintaining a nominal pressure of about 10 to 15 pounds per square inch have been used satisfactorily.

The slave cylinders 8 and 10 are each connected hydraulically to respective groups of actuation cylinders 11 through 16 and 17 through 22 such that when a quantity of hydraulic fluid is injected into one end of the slave cylinder, an equal amount of hydraulic fluid is extracted from the other end.

To maintain the total volume of each hydraulic system constant while the pistons 7 and 9 move from one end of the cylinders 8 and 10 to the other, a second piston rod 78—79 of the same diameter as the piston rods 57 and 59 is provided. Thus, the total volume of the slave cylinder 8 remains constant regardless of the positioning of the piston 7 therein.

The acceleration and deceleration of the pistons 7 and 9 are determined by the rate of fluid displacement of the actuation cylinders which in turn is determined by the profiles of both the cam 34 and the cams 23 through 28. Proper design of the cam 34 will produce desirable output dynamics or movements of the piston rods 57 and 59 even though simple and inexpensive eccentrics are used for the cams 23 through 28.

An important feature of this invention resides in the fact that the energy input for driving and positioning the output members 3 and 4 is furnished by the mechanical source which oscillates the shaft 31, and therefore no supply of hydraulic-fluid under high pressure is required. Thus, as a selected cam is caused to rotate through a half revolution, the two pistons 29 and 30 will develop the hydraulic pressure on one side and the vacuum on the other to drive the slave piston 7.

While there have been shown and described and pointed out the fundamental novel features of the invention as applied to the preferred embodiment, it will be understood that various ommissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. A positioning device comprising a fluid chamber having a member movable therein, and a plurality of fluid displacement means arranged in pairs, one fluid displacement means of each pair being hydraulically coupled to the fluid chamber on one side of the movable member and the other fluid displacement means of each pair being hydraulically coupled to the fluid chamber on the other side of the movable member.

2. A positioning device comprising a slave cylinder, and a plurality of fluid displacement means arranged in pairs, one fluid displacement means of each pair being hydraulically coupled to one end of the slave cylinder and the other fluid displacement means of each pair being hydraulically coupled to the other end of the slave cylinder.

3. In a closed hydraulic system, a slave cylinder, a plurality of pairs of coacting cylinders having pistons therein for respectively displacing fluid of said slave cylinder in opposite directions, and actuating means common to the pistons of said coacting cylinders whereby a displacement of the fluid in the slave cylinder produced by one of each pair of said coacting cylinders is compensated in the other of the pair of said coacting cylinders.

4. A positioning device comprising a slave cylinder, a plurality of actuation cylinders hydraulically coupled to the slave cylinder and selective drive means mechanically coupled to the actuation cylinders, said drive means being operable to transmit mechanical energy to selected actuation cylinder, the selected actuation cylinder being operable to displace predetermined quantities of hydraulic fluid for causing a selected displacement of the slave cylinder.

5. A positioning device comprising a double-acting slave cylinder, a plurality of actuation cylinders hydraulically coupled to the slave cylinder, and a mechanical drive means for selectively displacing fluid from the actuation cylinders, each of said actuation cylinders being operable to displace a selected quantity of hydraulic fluid to a selected end of the slave cylinder.

6. A positioning device comprising a slave cylinder with a piston therein, a plurality of actuation cylinders arranged in pairs and each having a piston therein, one actuation cylinder of each pair being hydraulically coupled to one end of the slave cylinder and the other actuation cylinder of each pair being coupled to the other end of the slave cylinder, and a drive means mechanically coupled to the pistons in the actuation cylinders for displacing selective pairs of the pistons, fluid from each cylinder of a pair being displaced oppositely with respect to the other, whereby the piston of the slave cylinder is moved by equal amounts of fluid being removed from one end of the slave cylinder and being injected into the other end thereof.

7. The positioning device according to claim 6 wherein the drive means comprises a shaft having a plurality of cams rotatably mounted thereon, and a clutch means associated with each of the cams, each clutch means being operable to selectively engage and lock the associated cam to the shaft whereby pistons within selected actuation cylinders will be displaced.

8. A positioning device comprising a slave cylinder with a piston movable therein, a plurality of actuation cylinders arranged in pairs and each having a piston therein, one actuation cylinder of each pair being hydraulically connected to one end of the slave cylinder and the other actuation cylinder of the pair being hydraulically connected to the other end of the slave cylinder, drive means mechanically coupled to selectively displace the pistons in pairs of actuation cylinders, said drive means being coupled to cause a positive displacement of fluid in one of the actuation cylinders of each of the selected pairs and to cause a negative displacement of fluid in the other cylinder of the pair whereby the position of the piston in the slave cylinder is determined by the total displacements of the various actuation cylinders.

9. A random access mechanism comprising an access arm to be positioned selectively along a first and a second axis, said access arm being mechanically coupled to two pistons each movable in separate slave cylinders, a plurality of actuation cylinders each having a piston therein hydraulically coupled to each of the slave cylinders, and a selective drive means mechanically coupled to all of the pistons within the actuation cylinders, said drive means being operable to first displace fluid from selected actuation cylinders operatively associated with a first of the slave cylinders and thereby to selectively displace the piston therein to move the access arm to a selected position on the first axis, said drive means thence being operable to displace fluid from selected actuation cylinders associated with the second slave cylinder, and thereby to selectively displace the second piston and to move the access arm to a selected position on the second axis.

10. A random access mechanism comprising an access arm to be positioned selectively along both a first axis and a second axis, said access arm being mechanically coupled to two pistons each movable within separate slave cylinders, a plurality of pairs of actuation cylinders each having a piston therein hydraulically coupled to each of the slave cylinders, one actuation cylinder of each pair being hydraulically connected to one end of a slave cylinder and the other actuation cylinder of the pair being hydraulically connected to the other end of the same slave cylinder, drive means mechanically coupled to selectively displace fluid from pairs of actuation cylinders such that one cylinder of a pair is displaced positively while the other cylinder is displaced negatively, each piston of a slave cylinder being operable to move in accordance with the algebraic sum of the actuation cylinder pairs and being operable to move the access arm to a selected position on the corresponding axis.

11. A random access mechanism comprising an access arm to be positioned selectively along both a first axis and a second axis, said access arm being mechanically coupled to two independently movable pistons, each within separate slave cylinders, a plurality of pairs of actuation cylinders each having a piston therein arranged in two groups, each group being associated with one of the slave cylinders, one actuation cylinder of each pair being hydraulically connected to one end of a slave cylinder and the other actuation cylinder of the pair being hydraulically connected to the other end of the same slave cylinder, drive means mechanically coupled to selectively displace fluid from pairs of actuation cylinders such that when fluid from one cylinder of a pair is displaced positively, fluid from the other cylinder will be displaced negatively, said drive means being operable to displace fluid from selected cylinders of the first group while the pistons in the cylinders of the second group remain quiescent whereby the piston of the first slave cylinder moves and drives the access arm to a selected position on the first axis, said drive means being subsequently operable to displace fluid from selected cylinders of the second group while the pistons in the cylinders of the first group remain quiescent whereby the piston of the second slave cylinder moves and drives the access arm to a selected position on the second axis.

12. The random access mechanism according to claim 11 and further comprising a first detenting means for locking and holding the access arm in a fixed position on the first axis while the second slave cylinder moves the access arm along the second axis, and a second detenting means for locking and holding the access arm in a fixed position on the second axis while the first slave cylinder moves the access arm along the first axis.

13. The random access mechanism according to claim 12 wherein is included a fluid reservoir and two valve means, a first valve means being operable to open the fluid reservoir to both ends of the first slave cylinder when the access arm is held by the first detenting means, the second valve means being operable to open the fluid reservoir to both ends of the second slave cylinder when the access arm is held by the second detenting means.

References Cited in the file of this patent

UNITED STATES PATENTS

| | | |
|---|---|---|
| 2,192,175 | Ballard | Mar. 5, 1940 |
| 2,429,390 | Case | Oct. 21, 1947 |
| 2,569,507 | Schlegell | Oct. 2, 1951 |
| 2,607,196 | May | Aug. 19, 1952 |

FOREIGN PATENTS

| | | |
|---|---|---|
| 581,686 | Great Britain | Oct. 22, 1946 |
| 1,126,502 | France | July 30, 1956 |